United States Patent
Krech et al.

(10) Patent No.: US 6,538,075 B1
(45) Date of Patent: Mar. 25, 2003

(54) THERMOPLASTIC POLYURETHANE

(75) Inventors: Ruediger Krech, Diepholz (DE); Juergen Mueller, Wetschen (DE); Norbert Pohlmann, Nortrup (DE); Paul Sellig, Lemförde (DE); Rolf Steinberger, Schledehausen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/048,275

(22) PCT Filed: Aug. 8, 2000

(86) PCT No.: PCT/EP00/07655

§ 371 (c)(1),
(2), (4) Date: Jan. 28, 2002

(87) PCT Pub. No.: WO01/12692

PCT Pub. Date: Feb. 22, 2001

(30) Foreign Application Priority Data

Aug. 18, 1999 (DE) .......................................... 199 39 112

(51) Int. Cl.⁷ .............................................. C08G 18/82
(52) U.S. Cl. ...................................... 525/458; 525/440
(58) Field of Search ................................ 525/440, 458

(56) References Cited

U.S. PATENT DOCUMENTS

| | | | |
|---|---|---|---|
| 4,342,847 A | 8/1982 | Goyert et al. |
| 5,026,814 A | 6/1991 | Re et al. |
| 5,545,707 A | 8/1996 | Heidingsfeld et al. |
| 5,739,250 A | 4/1998 | Kirchmeyer et al. |
| 5,795,948 A | 8/1998 | Heidingsfeld et al. |
| 5,905,133 A | 5/1999 | Müller et al. |

FOREIGN PATENT DOCUMENTS

| | | |
|---|---|---|
| DE | 2051027 | 4/1971 |
| DE | 2854409 | 6/1980 |
| DE | 19625987 | 1/1998 |
| EP | 417553 | 3/1991 |
| EP | 571828 | 12/1993 |
| EP | 571831 | 12/1993 |

OTHER PUBLICATIONS

PCT International Search Report–Nov. 10, 2000.
International Preliminary Examination Report Dated Apr. 2, 2002.

*Primary Examiner*—Rachel Gorr
(74) *Attorney, Agent, or Firm*—Fernando A. Borrego

(57) ABSTRACT

The invention relates to thermoplastic polyurethane with a Shore hardness of 45A to 80A, a tensile strength, according to DIN 53504, higher than 5 Mpa, a tear strength, according to DIN 53515 higher than 30 N/mm and an abrasion according to DIN 53516 of less than 250 $mm^3$.

8 Claims, No Drawings

THERMOPLASTIC POLYURETHANE

The invention relates to thermoplastic polyurethanes with a Shore A hardness of from 45 to 80, preferably from 45 to 71, a tensile strength to DIN 53504 of above 15 MPa, preferably from 18 to 40 MPa, a tear-propagation resistance to DIN 53515 of above 30 N/mm, preferably from 35 to 60 N/mm, and abrasion to DIN 53516 of less than 250 mm$^3$, preferably from 150 to 40 mm$^3$. The invention further relates to a process for preparing thermoplastic polyurethanes with a Shore A hardness of from 45 to 80, and also to the thermoplastic polyurethanes which can be prepared by this process.

Thermoplastic polyurethanes, also referred to below as TPUs, and also processes for their preparation, are well known and have been described many times. These TPUs are semicrystalline materials and belong to the class of thermoplastic elastomers. They feature, inter alia, good strength, abrasion, tear-propagation resistance and chemicals resistance, and can be prepared at almost any hardness desired by using appropriate raw material formulations. They also have advantages in terms of cost-effective preparation, for example using the belt process or the extrusion process, which can be carried out continuously, and in terms of easy thermoplastic processing.

Thermoplastically processable polyurethane elastomers based on aromatic diisocyanates are usually prepared by one of two continuous processes, the belt process and the extrusion process. Hardness and crystallinity, and also processing performance, may readily be influenced and varied here via the molar ratio of chain extender/polyol. However, if a hardness in the range Shore A<80 is desired the reaction rate falls, primarily due to the small amounts of chain extenders, and the products become tacky, are defective in terms of crystallization and are difficult or impossible to process by injection molding or extrusion.

One method of obtaining relatively soft TPUs with hardness of up to Shore A 60 is to start with a TPU having a hardness of Shore A 85 to 90 and add from 20 to 40% of plasticizer. These plasticized TPUs crystallize well and process well, but, like all plasticized plastics, have certain disadvantages caused by using the plasticizer, for example bleed-out of plasticizer and plasticizer odor.

Other attempts to prepare relatively soft TPUs have consisted in modifying the structure of the TPU polymer chain, in particular the size of what is known as the hard-phase blocks, by forming prepolymers from long-chain polyols and an excess of diisocyanate and then reacting with a low-molecular-weight diol chain extender.

In EP 571 828, for example, long-chain polyol is reacted with an excess of MDI to give a prepolymer, which is then reacted with 1,4-butanediol chain extender to give a high-molecular-weight TPU with a Shore A hardness of from 85 to 98. DE-A 196 259 87 gives further modification of this principle.

In DE-A 28 54 409 thermoplastic polymers previously produced, including TPUs, for example, are metered into barrel section 1 of an extruder, while linear polyols, chain extenders and aromatic diisocyanates are fed into barrel section 2 or into other barrel sections. This technical teaching does not permit a reaction or even a controlled cleavage of the TPU with chain extenders for controlled preparation of hard phases which crystallize well, since the compounds reactive to isocyanates immediately react with the isocyanate which is introduced at the same time. A process of this type leads in practice to nothing more than a mixture of a previously prepared high-molecular-weight TPU with a high-molecular-weight soft phase made from polyol, MDI and chain extender.

It is an object of the present invention, therefore, to develop thermoplastic polyurethanes with a Shore A hardness of from 45 to 80 which, without the use of plasticizers, have improved mechanical properties, in particular improved tensile strength and tear-propagation strength and reduced abrasion. The TPUs should also have excellent suitability for processing by injection molding or extrusion. Processes for preparing thermoplastic polyurethanes of this type with a Shore A hardness of from 45 to 80 were also to be developed.

We have found that this object is achieved by the thermoplastic polyurethanes described at the outset and by the processes set out below.

The novel thermoplastic polyurethanes are preferably based on reacting thermoplastic polyurethanes with a Shore D hardness of from 30 to 80, preferably from 40 to 80, particularly preferably from 40 to 70, with a diol (c) which has a molar mass of from 62 to 700 g/mol, preferably from 62 to 250 g/mol, and with an isocyanate (a), and also, if desired, catalysts (d) and/or compounds (b) having a molar mass of from 701 to 8000 g/mol and reactive to isocyanates.

The novel TPU products particularly preferably derive from reacting a mixture comprising 15 to 50% by weight of the hard thermoplastic polyurethanes, preferably with a D hardness of from 30 to 80, from 0.15 to 3.0% by weight of (c) and from 84.85 to 47% by weight in total of (a) and, if desired, (b), where the percentages given are based on the total weight of the mixture.

The novel process for preparing the thermoplastic polyurethanes with a Shore A hardness of from 45 to 80 may comprise reacting, in a first step (i), a thermoplastic polyurethane with a diol (c) which has a molar mass of from 62 to 700 g/mol, preferably from 62 to 250 g/mol, and then, in a further reaction step (ii), reacting the reaction product from (i) with an isocyanate (a) and also, if desired, with (b) compounds having a molar mass of from 701 to 8000 g/mol and reactive to isocyanates, and with (c) diols having a molar mass of from 62 to 700 g/mol, preferably from 62 to 250 g/mol, and with (d) catalysts and/or with (e) auxiliaries and/or additives, preferably with (b) compounds having a molar mass of from 701 to 8000 g/mol and reactive to isocyanates. The step (i) provides the hard phases for the end product via the TPU used in step (i), while in step (ii), in particular through the preferred use of component (b), the build-up of the soft phases takes place.

The technical teaching according to the invention is that TPU with a Shore D hardness of from 30 to 80 and with a well developed hard-phase structure which crystallizes well is first melted in a reaction extruder and degraded using a low-molecular-weight diol to give a prepolymer with hydroxyl end groups. The original hard-phase structure which crystallizes well is substantially retained and can then be utilized to obtain relatively soft TPUs with the advantageous properties of the hard TPU, such as a granular structure which is free-flowing and permits easy feeding, good mold-release performance and high injection-molding speed.

The starting material, i.e. the thermoplastic polyurethane, which is reacted with (c) in step (i), preferably in the molten state and particularly preferably at from 200 to 250° C., and preferably for 0.1 to 4 min, particularly preferably from 0.1 to 1 min, may be a well known thermoplastic polyurethane, for example in pelletized form. These TPUs preferably have a Shore D hardness of from 30 to 80, since TPUs of this hardness have a well developed hard-phase structure which crystallizes well. The TPU to be used in this step may be based on the starting components (a), (b) and, if desired, (c), (d) and/or (e) described below and may have been produced by well known processes, such as the one-shot process or the prepolymer process, on belt systems or in reaction extruders.

The weight ratio of TPU to component (c) in step (i) is usually from 100:0.5 to 100:10, preferably from 100:1 to 100:5.

The reaction of the TPU with the short-chain diol (c) in reaction step (i) is preferably carried out in the presence of usual catalysts (d), for example those described below. The use of metal-based catalysts is preferred for this reaction. The reaction in step (i) is preferably conducted in the presence of from 0.1 to 2% by weight of catalyst, based on the weight of component (c). The reaction in the presence of catalysts of this type is advantageous for the ability to carry out the reaction in the short residence time available in the reactor, for example in a reaction extruder.

Step (i) is preferably carried out in a conventional reaction extruder. Reaction extruders of this type are well known and are described, for example, in the company literature of Werner & Pfleiderer or in DE-A 2 302 564. It is particularly preferable for the reaction extruder to have neutral and/or backward-conveying kneading blocks and back-conveying elements in the area in which the thermoplastic polyurethane is melted, and to have mixing elements on the screw, and toothed disks and/or toothed mixing elements in combination with back-conveying elements in the area in which the thermoplastic polyurethane is reacted with (c).

The reaction of the TPU with (c) in step (i) results in cleavage of the polymer chain of the TPU by (c). The reaction product of the TPU therefore has free hydroxyl end groups and according to the invention is further processed in the next step (ii) to give the actual product, the TPU with the hardness according to the invention.

The reaction in step (ii) of the reaction product from step (i) takes place according to the invention by adding, to the reaction product, isocyanates (a) and preferably compounds (b) reactive to isocyanates and having a molar mass of from 701 to 8000. The reaction of the reaction product with the isocyanate takes place by way of the hydroxyl end groups produced in step (i). The reaction in step (ii) preferably takes place at from 200 to 240° C., preferably for from 0.5 to 5 min, particularly preferably from 0.5 to 2 min, preferably in a reaction extruder, particularly preferably in the reaction extruder in which step (i) was carried out. The reaction of step (i) may, for example, take place in the first barrel sections of a conventional reaction extruder, and the reaction appropriate for step (ii) may take place downstream, i.e. in downstream barrel sections, after components (a) and (b) have been added. The first 30 to 50% of the length of the reaction extruder may, for example, be used for step (i) and the remaining 50 to 70% for step (ii).

The reaction in step (ii) may preferably take place in the presence of compounds (b) having a molar mass of from 701 to 8000 g/mol and reactive to isocyanates, (d) catalysts and/or (e) auxiliaries and/or additives, examples of which are described below. The remainder of component (c) which has not reacted with the TPU in step (i) may likewise be present in step (ii). It is not necessary to use plasticizers, since the novel TPUs have excellent properties, but they may be used if desired. It is particularly preferable for the component (b) which can preferably be used in step (ii) to differ in its chemical structure from the polyol used to prepare the thermoplastic polyurethane used in step (i). As described above, the TPU used in step (i) is also based on reacting isocyanates (a) with polyols (b) reactive to isocyanates. The difference may be, for example, that one of the polyols is a polyether polyol while the other polyol is a polyester polyol. Differences of this type in the components (b) reduce or suppress the tendency of the soft phase formed to crystallize.

The reaction in step (ii) preferably takes place with isocyanate groups in excess with respect to the groups reactive to isocyanates. The ratio between the isocyanate groups of component (a) and the hydroxyl groups of the components (b) and (c) introduced in steps (i) and (ii) is preferably from 1.02:1 to 1.2:1, particularly preferably 1.1:1.

In the novel, preferably continuous, process for preparing the TPUs the hard TPU may therefore first be melted in a corotating twin screw extruder and modified using low-molecular-weight diol with concomitant action of the catalyst, to give a prepolymer with hydroxyl end groups, so that it is then built up to give a high-molecular-weight soft TPU by adding (a) and preferably (b).

The novel product of step (ii) may be extruded, cooled and pelletized.

The TPU prepared according to the invention may be processed to give the desired films, fibers, moldings, linings in automobiles, rollers or pulleys, gaskets, cable plugs, folding bellows, tubes, cable sheathings, drag cables, drive belts or attenuating elements, in particular films, by conventional processes, e.g. injection molding, extrusion, a spinning process or a sintering process, also known as a powder slush process.

The thermoplastic polyurethanes which can be prepared by the novel process, in particular the films, fibers, moldings, linings in automobiles, rollers or pulleys, gaskets, cable plugs, folding bellows, tubes, cable sheathings, drag cables, drive belts or attenuating elements, in particular films, have the particularly high level of mechanical properties desired and abrasion resistances which are not achieved to this extent by other plastics of Shore A hardness from 45 to 70. Examples of components (a), (b), (c), (d) and/or (e) used in preparing the TPUs will be described below:

a) The organic isocyanates (a) used are conventional aliphatic, cycloaliphatic, araliphatic and/or aromatic isocyanates, preferably diisocyanates, such as tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, cyclohexylmethane 4,4'-, 2,4'- and/or 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, dimethyldiphenyl 3,3'-diisocyanate, diphenylethane 1,2-diisocyanate and/or phenylene diisocyanate.

b) Examples of compounds (b) reactive to isocyanates are polyhydroxyl compounds, also termed polyols, having molar masses of from 701 to 8000 g/mol, preferably from 701 to 6000 g/mol, in particular from 800 to 4000 g/mol, and preferably having an average functionality of from 1.8 to 2.6, preferably from 1.9 to 2.2, in particular 2. The materials preferably used as (b) are polyesterols and/or polyetherols and/or polycarbonatediols, particularly preferably polyesterdiols, such as polycaprolactone, and/or polyether polyols, such as those based on ethylene oxide, propylene oxide and/or butylene oxide, preferably polypropylene glycol, in particular polyetherols.

c) The diols (c) used may be compounds well known as chain extenders, for example alkanediols, alkenediols, alkynediols, in each case having from 2 to 12 carbon atoms, preferably having 2, 3, 4 or 6 carbon atoms, dialkylene ether glycols, diesters of terephthalic acid with alkanediols having from 2 to 4 carbon atoms, hydroxyalkylene ethers of hydroquinone, or di-, tri-, tetra-, penta-, hexa-, hepta-, octa-, nona- and/or decaoxyalkylene glycols having from 3 to 8 carbon atoms in the appropriate oxyalkylene radical, and mixtures of the compounds mentioned may also be used. The following compounds may be mentioned as examples: ethanediol, 1,2- and/or 1,3-propanediol, 1,6-hexanediol, 1,4-butanediol, cis- and/or trans-1,4-butenediol, diethylene glycol, dipropylene glycol, bis(ethanediol)terephthalate and/or bis(1,4-butanediol) terephthalate, 1,4-di(β-hydroxyethyl)hydroquinone, 1,4-bis(hydroxymethyl)benzene (BHMB), 1,3-bis(hydroxymethyl)benzene, 1,2-bis(hydroxymethyl)benzene, 1,2-bis(2-hydroxyethoxy)benzene, 1,3-bis(2-hydroxyethoxy)benzene and 1,4-bis(2-hydroxyethoxy)benzene (HQEE). Compounds preferably used as (c) are ethanediol, 1,3-propanediol, 1,4-butanediol and/or 1,6-hexanediol.

d) Suitable catalysts which in particular accelerate the reaction between the NCO groups in the diisocyanates (a) and the hydroxyl groups in structural components (b) are the usual known prior-art tertiary amines, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organic metal compounds, such as titanic esters or the compounds described below. Other than in the reaction step (i) the amounts of the catalysts usually used are from 0.0001 to 5 parts by weight per 100 parts by weight of polyhydroxyl compound (b). Particularly suitable catalysts which accelerate the degradation reaction of the hard TPUs with component (c) are organic metal compounds, such as titanic esters, e.g. tetrabutyl orthotitanate, iron compounds, e.g. iron(III) acetylacetonate, tin compounds, e.g. tin diacetate, tin dioctoate or tin dilaurate, or the dialkyltin salts of aliphatic carboxylic acids, for example dibutyltin diacetate, dibutyltin dilaurate or the like.

e) Besides catalysts, the usual auxiliaries and/or additives (e) may also be added to the structural components (a) and (b). Examples which may be mentioned are surface-active substances, flame retardants, antistats, nucleating agents, lubricants, mold-release agents, dyes, pigments, inhibitors, stabilizers to protect against hydrolysis or the effects of light or heat, or against oxidation or discoloration, agents to protect against microbial degradation, inorganic and/or organic fillers, reinforcing agents and plasticizers.

Further details concerning the abovementioned auxiliaries and additives may be found in the literature.

All of the molar masses mentioned in this text have the unit [g/mol].

The advantages of the invention will be described using the examples below.

EXAMPLES

Examples 1 to 16 described below used a Werner & Pfleiderer ZSK 58 twin-screw extruder. The length of the processing section of the extruder was 12 barrel sections and the length of each barrel section was four times the screw diameter. Melt was discharged from the extruder using a gear pump, and pelletization took place in a conventional underwater pelletizer. The resultant pellets were then dried in a fluidized-bed drier at from 90 to 110° C. with residence times of from 5 to 10 min to water contents <0.03% and then annealed at 80° C. for 15 hours. The temperatures of extruder barrel sections 1 to 3 were 250° C., those of barrel sections 4 and 5 were 230° C., those of barrel sections 6 to 12, including the melt discharge equipment, were 220° C. Under these conditions a throughput of about 200 kg/h and a rotation rate of 200 rpm gave a melt temperature of from 200 to 210° C. The hard TPU products (TPU 1–3) used for step (i) had been prepared by the belt process and were based on a polyesterdiol of molar mass 2000 g/mol made from adipic acid and from butanediol/hexanediol in a molar ratio of 2:1 and on butanediol chain extender and on the aromatic diisocyanate 4,4'-diisocyanatodiphenylmethane. The corresponding TPUs are shown in Table 1.

TABLE 1

| Product | Molar ratio butanediol:polyesterdiol | Hardness |
| --- | --- | --- |
| TPU 1 | 5.20:1 | Shore D 52 |
| TPU 2 | 4.56:1 | Shore D 47 |
| TPU 3 | 4.08:1 | Shore D 41 |

In Example 1 the degradation of a high-molecular-weight hard TPU by butanediol to give a prepolymer with OH end groups is first described.

70 kg/h of TPU 1 were fed continuously into barrel section 1 of the ZSK 58 twin-screw extruder, and melt samples (sample 1) were taken from the open barrel section 5.

For sample 2 the process was as for sample 1 except that 2.10 kg/h of butanediol and 4.0 g/h of tin dioctoate were fed into barrel section 3 and melt samples (sample 2) were likewise taken from the open barrel section 5. This sample 2 was comminuted and stirred several times with methanol at 50° C. to extract any unreacted butanediol, and the undissolved material after filtration was dried at 100° C. in a heated cabinet. The properties of samples 1 and 2 were determined firstly by measuring the viscosity of a 10% solution in DMF+1% of N-dibutylamine and by DSC measurements. In addition, OH end groups and acid end groups in sample 2 were determined by conventional analytical methods. The results of the measurements are shown in Table 2.

The following abbreviations and definitions apply:

Ex: Example

SV: Solution viscosity

Tensile strength: measured to DIN 53504

Elongation at break: measured to DIN 53504

Tear-propagation resistance: measured to DIN 53515

Abrasion: measured to DIN 53516

TABLE 2

| | SV (mPa · s) | DSC measurement | | | | | End group content [mmol/kg] | |
| | | Peak 1 [° C.] | Peak 2 [° C.] | Peak 3 [° C.] | $T_k$max [° C.] | Delta H [J/g] | Hydroxyl | Acid |
|---|---|---|---|---|---|---|---|---|
| Sample 1 | 70 | 186 | 199 | 210 | 131 | 8.7 | — | — |
| Sample 2 | 11 | — | 190 | 210 | 133 | 18.9 | 535 | 35 |

The fall-off of the solution viscosity, and also the end group contents, show that sample 2 has a markedly lower molar mass than sample 1. On the basis of the end group contents it can be estimated as about 3500 g/mol. The TPU used has therefore been cleaved according to the invention by the butanediol used.

The situation of the peak maxima from the second heating curve of the two samples is similar. The lower molar mass of sample 2 gives more rapid crystallization on cooling, and thus the enthalpy of melting delta H of sample 2, at 18.9 J/g, is markedly higher than that of the high-molecular-weight sample 1. The hard phases of the cleaved sample therefore crystallize extremely well, as desired.

Except for Example 8, which is a comparative example, Examples 2 to 16 describe the steps (i) and (ii) according to the invention for preparing the novel TPUs.

To react these hard TPUs in the reaction extruder in the novel process Examples 2 to 16 use a polyesterdiol of molar mass 2000 g/mol, made from adipic acid and ethylene glycol/butanediol in a molar ratio of 1:1, termed "polyesterdiol" in the table.

To determine their mechanical properties the products of the experiments were injection molded in the usual way to give test specimens, and these were annealed at 100° C. for 20 hours before being tested.

Examples 2 to 5 below show the influence of the molar ratio of MDI to the total of butanediol and polyesterdiol.

TABLE 3

Mixing specifications for Examples 2 to 5

| Ex. | TPU 2 [kg/h] | Butanediol [kg/h] | Tin dioctoate | | Polyesterdiol [kg/h] | MDI [kg/h] | Molar ratio MDI/(butanediol + Polyesterdiol) |
| | | | No. 1 [g/h] | No. 2 [g/h] | | | |
|---|---|---|---|---|---|---|---|
| 2 | 70 | 2.10 | 4.0 | 4.0 | 116 | 21.16 | 1.04 |
| 3 | 70 | 2.10 | 4.0 | 4.0 | 116 | 21.57 | 1.06 |
| 4 | 70 | 2.10 | 4.0 | 4.0 | 116 | 21.97 | 1.08 |
| 5 | 70 | 2.10 | 4.0 | 4.0 | 116 | 22.38 | 1.10 |

For these examples barrel section 5 of the extruder was sealed and polyester diol, MDI and tin dioctoate No. 2 were continuously fed at this location.

Tin dioctoate No. 1 served to accelerate the degradation reaction. Tin dioctoate No. 2 served to accelerate the build-up reaction.

The properties of the products from Examples 2 to 5 are given in Table 4.

| Ex. | Hardness Shore A | Tensile strength [Mpa] | Elongation at break [%] | Tear-propagation resistance [N/mm] | Abrasion [mm³] | Sol. Vis. [mPa.s] |
|---|---|---|---|---|---|---|
| 2 | 66 A | 19 | 1010 | 42 | 206 | 37 |
| 3 | 68 A | 26 | 910 | 50 | 111 | 73 |
| 4 | 70 A | 37 | 780 | 54 | 49 | 120 |
| 5 | 70 A | 36 | 680 | 56 | 56 | 144 |

Examples 5* to 8 below show the influence of the amount of butanediol used. The molar ratio of MDI to the total of butanediol and polyesterdiol in these instances is 1.10.

TABLE 5

Mixing specifications for Examples 5* to 8

| Ex. | TPU 2 [kg/h] | Butanediol [kg/h] | Tin dioctoate | | Polyesterdiol [kg/h] | MDI [kg/h] |
| | | | No.1 [g/h] | No.2 [g/h] | | |
|---|---|---|---|---|---|---|
| 5* | 70 | 2.10 | 4.0 | 4.0 | 116 | 22.38 |
| 6 | 70 | 1.40 | 4.0 | 4.0 | 116 | 20.24 |
| 7 | 70 | 0.70 | 4.0 | 4.0 | 116 | 18.10 |
| 8 | 70 | — | — | 4.0 | 116 | 15.97 |

TABLE 6

Properties of products form Examples 5 to 8

| Ex. | Hardness Shore A | Tensile strength [Mpa] | Elongation at break [%] | Tear propagation res. [N/mm] | Abrasion [mm³] | Sol. Vis. [mPa.s] |
|---|---|---|---|---|---|---|
| 5* | 70 | 36 | 680 | 56 | 47 | 144 |
| 6 | 68 | 38 | 830 | 53 | 54 | 153 |
| 7 | 65 | 35 | 880 | 50 | 59 | 144 |
| 8 | 56 | 10 | 800 | 15 | 450 | 120 |

Example 8 gives the results from the comparative example. The product had very high tack, and underwater pelletization was therefore possible only for a short time due to formation of coarse clumps. There was also great difficulty with producing injection-molded test specimens and this was carried out only to allow properties to be compared with those of the novel products. In contrast, and as desired, the novel products exhibit excellent mechanical products, in particular surprisingly good tensile strength, tear-propagation resistance and abrasion values.

Examples 9 to 16 below show the influence of mixing specification the amount of the hard TPUs used on the properties of the resultant products. The amount of butanediol is in each case 3%, based on the amount of TPU, and the molar ratio of MDI to the total of butanediol and polyesterdiol is in each case 1.10, and the amounts of tin dioctoate No. 1 and No. 2 are in each case 4.0 g/h.

TABLE 7

Mixing specifications for Examples 5 and 9 to 16

| Ex. | TPU Type | Amount | Butanediol | Polyesterdiol | MDI |
|---|---|---|---|---|---|
| 9 | TPU 1 | 70 kg/h | 2.10 kg/h | 116 kg/h | 22.38 kg/h |
| 10 | TPU 1 | 60 kg/h | 1.80 kg/h | 124 kg/h | 22.57 kg/h |
| 11 | TPU 1 | 50 kg/h | 1.50 kg/h | 133 kg/h | 22.89 kg/h |
| 12 | TPU 2 | 60 kg/h | 1.80 kg/h | 124 kg/h | 22.57 kg/h |
| 13 | TPU 2 | 50 kg/h | 1.50 kg/h | 133 kg/h | 22.89 kg/h |
| 14 | TPU 3 | 70 kg/h | 2.10 kg/h | 116 kg/h | 22.38 kg/h |
| 15 | TPU 3 | 60 kg/h | 1.80 kg/h | 124 kg/h | 22.57 kg/h |
| 16 | TPU 3 | 50 kg/h | 1.50 kg/h | 133 kg/h | 22.89 kg/h |

TABLE 8

Properties of products from Examples 5 and 9 to 16

| Ex. | Hardness Shore A | Tensile strength [MPa] | Elongation at break [%] | Tear propagation res. [N/mm] | Abrasion [mm$^3$] | Sol Vis. [mPa.s] |
|---|---|---|---|---|---|---|
| 9 | 73 | 38 | 650 | 59 | 45 | 140 |
| 10 | 66 | 34 | 760 | 48 | 55 | 160 |
| 11 | 58 | 27 | 850 | 41 | 68 | 174 |
| 12 | 63 | 33 | 780 | 46 | 55 | 170 |
| 13 | 55 | 25 | 1030 | 38 | 80 | 178 |
| 14 | 68 | 35 | 720 | 54 | 60 | 125 |
| 15 | 62 | 30 | 870 | 44 | 65 | 140 |
| 16 | 52 | 21 | 1200 | 35 | 85 | 155 |

The examples according to the invention clearly show that it has been possible to achieve the object by using the technical teaching according to the invention. The TPUs of Shore A hardness from 45 to 80 have a high level of mechanical properties and also gave considerably fewer problems when they were processed by extrusion or injection molding. These results are all the more surprising since soft TPUs were produced using hard TPUs. It was not to be expected that the hard TPUs would cleave while retaining the hard phases which give rise to the very good mechanical properties. This also applies to the incorporation of these cleavage products in the new TPU polymer chains composed of diisocyanates and, preferably, polyols.

We claim:

1. A thermoplastic polyurethane with a Shore A hardness of from 45 to 80, a tensile strength according to DIN 53504 of above 15 MPa, a tear-propagation resistance according to DIN 53515 of above 30 N/mm and abrasion according to DIN 53516 of less than 250 mm$^3$, comprising the reaction product of thermoplastic polyurethanes having a Shore D hardness of from 30 to 80, a diol which has a molar mass of from 62 to 700 g/mol, and an isocyanate, and also catalysts (d) and compounds (b) having a molar mass of from 701 to 8000 g/mol and reactive to isocyanates.

2. A process for preparing thermoplastic polyurethanes with a Shore A hardness of from 45 to 80, comprising reacting, in a first step (i), a thermoplastic polyurethane with a diol (c) which has a molar mass of from 62 to 700 g/mol, and then, in a further reaction step (ii), reacting the reaction product from (i) with an isocyanate (a) and also, optionally, with (b) compounds having a molar mass of from 701 to 8000 g/mol and reactive to isocyanates, and with (c) diols having a molar mass of from 62 to 700 g/mol, and with (d) catalysts and/or with (e) auxiliaries and/or additives.

3. A process as claimed in claim 2, wherein the thermoplastic polyurethane which is reacted with (c) in step (i) has a Shore D hardness of from 30 to 80.

4. A process as claimed in claim 2, wherein the reaction in step (i) is carried out in the presence of from 0.1 to 2% by weight of catalyst, based on the weight of component (c).

5. A process as claimed in claim 2, wherein step (i) is carried out in a reaction extruder.

6. A process as claimed in claim 5, wherein the reaction extruder has neutral and/or backward-conveying kneading blocks and back-conveying elements in the area in which the thermoplastic polyurethane is melted, and has mixing elements on the screw, and toothed disks and/or toothed mixing elements in combination with back-conveying elements in the area in which the thermoplastic polyurethane is reacted with (c).

7. A process as claimed in claim 2, wherein the ratio between the isocyanate groups of component (a) and the hydroxyl groups of the components (b) and (c) introduced in steps (i) and (ii) is from 1.02:1 to 1.2:1.

8. A process as claimed in claim 2, wherein the component (b) which can be used in step (ii) differs in its chemical structure from the polyol used to prepare the thermoplastic polyurethane used in step (i).

* * * * *